2 Sheets--Sheet 1.

B. M. NYCE.

Refrigerator Buildings.

No. 5,772. Reissued Feb. 24, 1874.

*Witnesses*

H. Clay Smith

M. F. Halleck

*Inventor*

Benjamin M. Nyce per Fisher & Duncan

Attys

A.M. PHOTO-LITHOGRAPHIC Co. N.Y. (OSBORNE'S PROCESS.)

2 Sheets--Sheet 2.

B. M. NYCE.

Refrigerator Buildings.

No. 5,772. Reissued Feb. 24, 1874.

*Witnesses*

H. Clay Smith

M. F. Hallock

*Inventor*

Benjamin M. Nyce per Fisher & Duncan

Attys.

AM. PHOTO-LITHOGRAPHIC Co. N. Y. (OSBORNE'S PROCESS.)

UNITED STATES PATENT OFFICE.

BENJAMIN M. NYCE, OF CLEVELAND, OHIO.

IMPROVEMENT IN REFRIGERATOR-BUILDINGS.

Specification forming part of Letters Patent No. 21,977, dated November 2, 1858; reissue No. 1,068, dated October 23, 1860; reissue No. 2,036, dated May 16, 1865; reissue No. 2,038, dated July 25, 1865; extended seven years; reissue No. 5,772, dated February 24, 1874; application filed September 29, 1873.

*To all whom it may concern:*

Be it known that I, BENJAMIN M. NYCE, of the city of Cleveland, in the county of Cuyahoga and State of Ohio, have invented certain Improvements in Preserving Fruits and other perishable substances, of which the following is a specification:

This invention relates to the construction of a refrigerating and preserving house, consisting of an upper ice-compartment and a lower preserving-chamber, in which it is designed to carry on the cooling and preserving processes on a large scale, and in which, by reason of the magnitude of the structure necessary for this purpose, the floor of the ice-compartment, which is also the ceiling of the preserving-chamber, is required to be supported not only at its margins, along the walls of the building, but also at various intermediate points. The essential features of the invention are, first, provision for collecting the water of condensation that accumulates on the under side of the metallic floor of the ice-chamber, whereby its dripping into the preserving-chamber may be prevented; secondly, an agitator placed within the preserving-chamber, and made capable of being operated, when the chamber is entirely closed, for the purpose of producing a circulation of the contained air of the chamber.

A refrigerating-house embodying these features is shown in the accompanying drawings, wherein—

Figure 1:
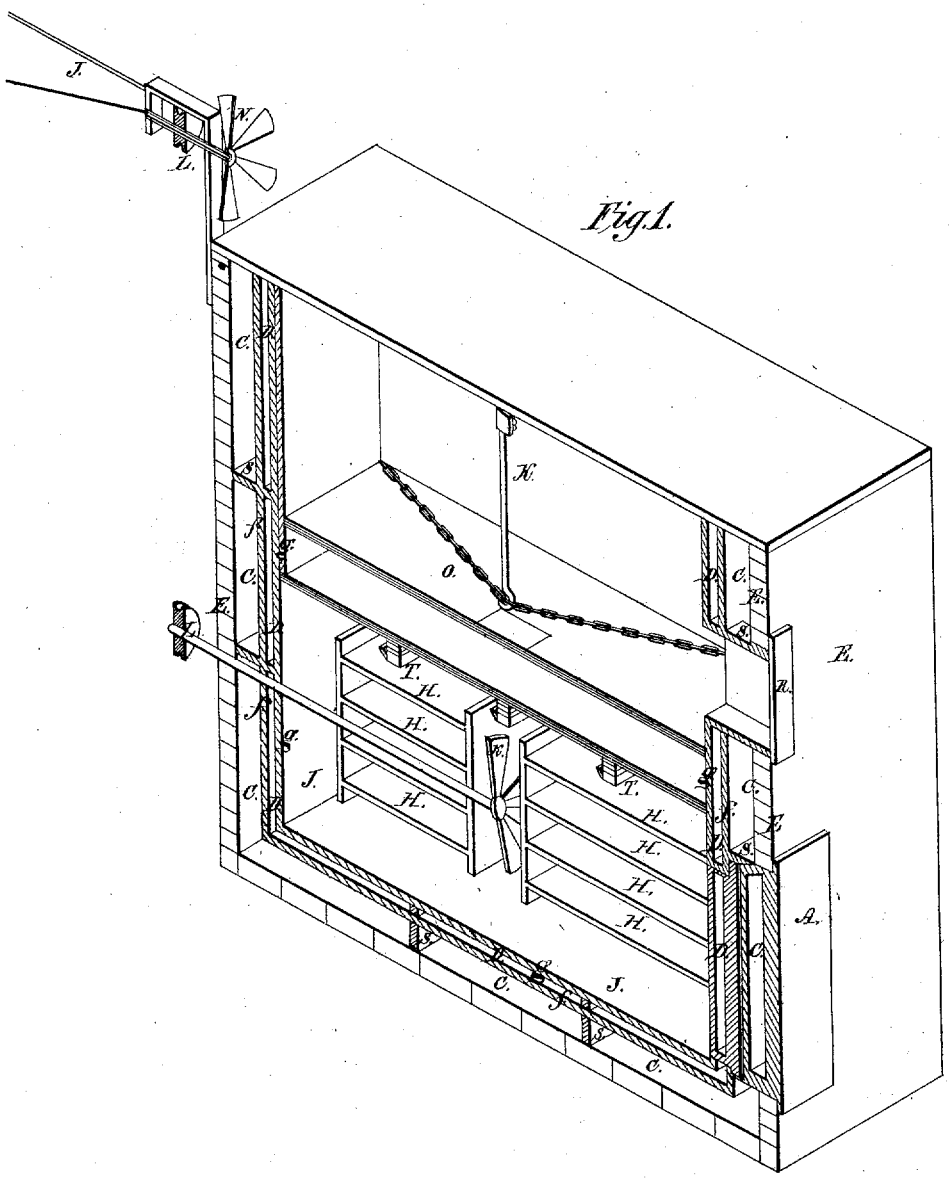
Figure 2:
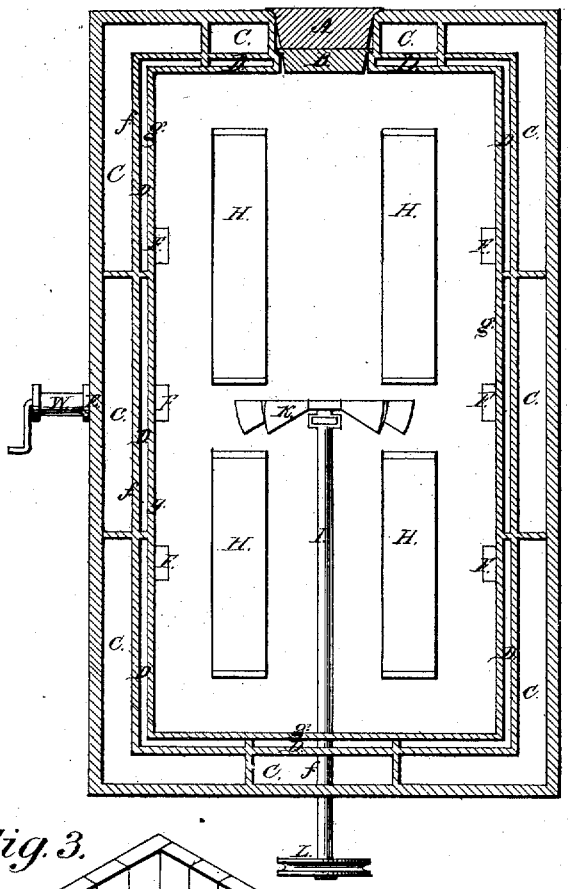
Figure 3:
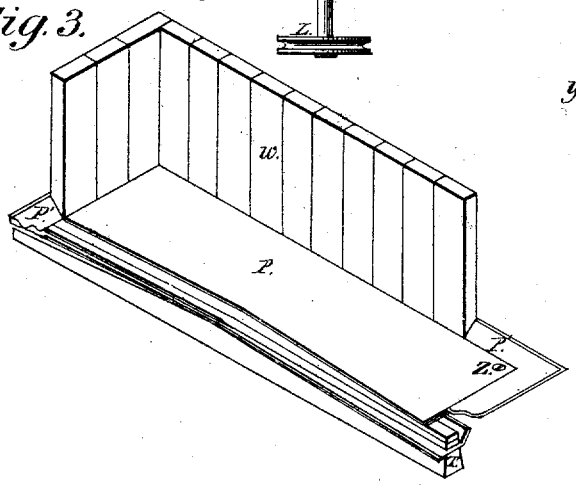
Figure 4:
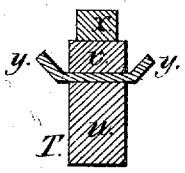

Figure 1 is a central vertical sectional elevation thereof. Fig. 2 is a longitudinal transverse section taken on a plane below the ice-floor. Fig. 3 is a transverse sectional view of the ice-floor, showing a supporting-beam and one manner of securing the gutters thereto. Fig. 4 is a transverse vertical section, showing the peculiar construction of the supporting-beam and gutter attached thereto.

The details of construction referred to in the drawing are, the outer casing E of the non-conducting wall; middle wall *f;* the inner partition *g;* the compartment C between said outer casing and middle wall; the compartment D between said middle wall and inner partition; the ice-floor P; the flange $p'$, Fig. 3; discharge-pipe Z; the adjustable transverse partition, platform, or follower O in the ice-chamber, for protecting the ice from contact with any non-conductor that may be placed above it; windlass W and cord K, for elevating said follower; the door R; the trap-door Q; transverse supporting-beams T, consisting of the upper portion *x*, made of iron, the second part, *v*, made of wood, and the principal portion of the supporting-beam U; the metallic troughs or gutters *y y*, secured to the beam, for collecting the water of condensation that may accumulate about the upper portion of said beams; the outer door A of the preserving-chamber; the inner door B of the same; the shelves H; the rotary fan or agitator K; the wind-wheel N; and the receptacle F, for lime or other absorbents, located in any convenient portion of the room.

The walls of the preserving-chamber are to be made as nearly impervious to air and moisture as possible. The ice-chamber is separated from the preserving-chamber by a suitably-supported metallic partition, which may serve at the same time as the floor of the upper apartment and the ceiling of the lower one; and, in order to guard against an air-space between the ice and this metallic partition, (which would impair the refrigerating effect upon the atmosphere of the preserving-chamber,) the ice may be laid directly upon the metallic floor. By this arrangement, while any actual contact between the ice and the air of the preserving-chamber is avoided, this chamber, by reason of the conducting power of the metal, is cooled as effectually as if the metallic partition were not employed, and, at the same time, the continuity of the metal constituting the floor prevents the water formed by the melting of the ice from entering the refrigerating-chamber below. The accumulation of the water upon the floor is prevented by suitable discharge-orifices in one end of the floor. The same inclination of the floor that causes the water from the melting of the ice to flow toward these orifices in one end of the floor will also cause the water of condensation that forms on the under side of the floor—which, at the same time, forms the ceiling of the refrigerating-apartment—to move toward the supporting-beams. Its further progress being arrested by these beams, it gathers in the troughs or gutters, (shown as attached to the beams,) from which it may be taken off or removed by any convenient means. This use of troughs or gutters in connection with a metallic ceiling to the preserving-chamber, when said ceiling is cooled by the ice above it, operates to extract the moisture from the air by condensing it on the colder surface of the ceiling, whence it is removed in the manner indicated. This not only makes the air cool, but also renders it dry, thus better adapting it to the preservation of all perishable animal and vegetable substances. By thus removing the water of condensation again as it forms on the ceiling of the lower apartment of the refrigerating-house, it is prevented from dripping into such chamber, and becoming a disturbing element by keeping the shelves and the floor constantly wet, and mingling with the liquids, fruits, and various other articles placed in said chamber for preservation.

The platform or follower O is used for supporting some non-conducting or poorly-conducting substance, such as sawdust, shavings, or the like, in order to prevent, in as large measure as possible, the evaporation of the ice by the contact with it of the air in the upper part of the ice-chamber. The use of platforms or ice-covers as a support for such non-conducting substances preserves the ice in much more cleanly condition, and facilitates the cleaning out of the ice-apartment whenever it may be desired.

The rotary fan or agitator K is placed within the refrigerating-chamber, and made capable of being rotated, when the chamber is closed, by any known mechanical means, thereby producing within the closed chamber, when desired, a circulation of the contained air.

The use of non-conducting substances, placed on the ice in ice-houses to retard the melting, is not claimed as new; neither are fans and other mechanical appliances for driving air into the refrigerating room or chamber to be regarded as new.

It is also known that, in ordinary domestic refrigerators, it has been proposed to place a continuous sheet of metal beneath the bottom of the ice-box to catch the drip; but such a device, if applied to a refrigerating-house constructed on an extensive scale, would be found seriously to interfere with its efficiency, since the stratum of air confined between such drip-pan and the floor of the ice-chamber above would prevent the ready conduction of caloric from the preserving-chamber. It would be found impracticable, also, in a large preserving-house, to give so steep an inclination to the ceiling of the preserving or refrigerating apartment that the water of condensation, which forms on the under side thereof, would flow all the way from the apex of the incline to the side walls of the chamber, as has sometimes been proposed in the construction of the ordinary small domestic refrigerator. For this reason, it is proposed to employ a series of small troughs or gutters, arranged at brief intervals just underneath the metallic ceiling of the refrigerating-apartment, which, while they catch the drip without requiring any very steep inclination of the ceiling, offer practically no impediment to the full refrigerating action of the ice upon the air of the lower chamber.

What is claimed is—

1. In combination with the metallic ceiling of the main apartment of a refrigerating or preserving house, when such ceiling is cooled by ice placed above it, and is suitably supported by girders, a series of troughs or gutters, traversing the under side of such ceiling, to catch the water of condensation that forms thereon.

2. In a closed refrigerating or preserving house, an agitator for producing a circulation of air within the preserving-chamber.

Witnesses: BENJ. M. NYCE.

W. M. NYCE,

GEO. D. HINSDALE.